(12) United States Patent
Neilson et al.

(10) Patent No.: US 8,913,899 B2
(45) Date of Patent: Dec. 16, 2014

(54) DISTRIBUTION OF OPTICAL POWER IN AN OPTICAL TRANSPORT SYSTEM

(75) Inventors: David T. Neilson, Old Bridge, NJ (US); Peter J. Winzer, Aberdeen, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 662 days.

(21) Appl. No.: 12/961,677

(22) Filed: Dec. 7, 2010

(65) Prior Publication Data
US 2012/0141140 A1 Jun. 7, 2012

(51) Int. Cl.
H04B 10/00 (2013.01)
H04J 14/02 (2006.01)
H04B 10/61 (2013.01)
H04B 10/2587 (2013.01)

(52) U.S. Cl.
CPC ............ H04B 10/61 (2013.01); H04B 10/2587 (2013.01)
USPC ............................... 398/171; 398/79; 398/140

(58) Field of Classification Search
USPC ............ 398/48, 49, 57, 79, 91, 171; 359/237; 700/295
See application file for complete search history.

(56) References Cited

U.S. PATENT DOCUMENTS

| | | | | |
|---|---|---|---|---|
| 5,278,688 A | * | 1/1994 | Blauvelt et al. | 398/91 |
| 5,608,565 A | * | 3/1997 | Suzuki et al. | 359/237 |
| 6,353,609 B1 | * | 3/2002 | Ethridge et al. | 370/352 |
| 6,778,550 B1 | * | 8/2004 | Blahut | 370/443 |
| 6,796,555 B1 | * | 9/2004 | Blahut | 370/395.1 |
| 7,110,671 B1 | * | 9/2006 | Islam | 398/51 |
| 7,209,657 B1 | * | 4/2007 | Islam | 398/45 |
| 7,260,655 B1 | * | 8/2007 | Islam | 709/252 |
| 7,269,356 B2 | * | 9/2007 | Winzer | 398/135 |
| 7,305,186 B2 | * | 12/2007 | Islam | 398/51 |
| 7,715,714 B2 | * | 5/2010 | Agranat | 398/58 |
| 2004/0208541 A1 | * | 10/2004 | Gripp et al. | 398/45 |
| 2007/0154221 A1 | * | 7/2007 | Mcnicol et al. | 398/135 |
| 2008/0075460 A1 | * | 3/2008 | Islam | 398/45 |
| 2009/0234512 A1 | * | 9/2009 | Ewing et al. | 700/295 |
| 2011/0033188 A1 | * | 2/2011 | Elbers et al. | 398/79 |
| 2011/0200334 A1 | * | 8/2011 | Wu et al. | 398/79 |
| 2012/0141140 A1 | * | 6/2012 | Neilson et al. | 398/171 |
| 2012/0155882 A1 | * | 6/2012 | Sheth et al. | 398/98 |
| 2012/0195600 A1 | * | 8/2012 | Winzer | 398/143 |

* cited by examiner

*Primary Examiner* — Ken Vanderpue
*Assistant Examiner* — Amritbir Sandhu
(74) *Attorney, Agent, or Firm* — Mendelsohn, Drucker & Dunleavy, P.C.; Yuri Gruzdkov; Steve Mendelsohn

(57) ABSTRACT

An optical-power-distribution (OPD) subsystem that provides means for supplying optical local-oscillator signals and optical-carrier signals to various optical line cards, without the need for each optical line card to have a corresponding individual laser source. In one embodiment, a single laser coupled to the OPD subsystem provides optical local-oscillator signals and optical-carrier signals to multiple optical line cards. In another embodiment, multiple lasers coupled to the OPD subsystem provide multiple optical local-oscillator signals and optical-carrier signals to a single line card. An OPD subsystem may provide significant power savings in the operation of the corresponding optical transport system, a reduction in the required equipment-cooling capacity, and an increase in the device-packing density within optical line cards and inside equipment cabinets that house optical line cards.

19 Claims, 4 Drawing Sheets

100

DISTRIBUTION OF OPTICAL POWER IN AN OPTICAL TRANSPORT SYSTEM

BACKGROUND

1. Field of the Invention

The present invention relates to optical communication equipment and, more specifically but not exclusively, to the generation and distribution of optical power for use in optical line cards and other optical devices of an optical transport system.

2. Description of the Related Art

This section introduces aspects that may help facilitate a better understanding of the invention(s). Accordingly, the statements of this section are to be read in this light and are not to be understood as admissions about what is in the prior art or what is not in the prior art.

An optical line card is used for interfacing optical communication lines, e.g., carrying optical signals to and from a central office to the rest of the telecommunication network's central offices. A typical optical line card is a modular optoelectronic circuit assembled on a printed circuit board. Its representative modules may include one or more optical-power sources (e.g., lasers), an optical transmitter, an optical receiver, an optical add/drop multiplexer, a digital signal processor, a controller, a power-management unit, a performance monitor, various optical and electrical interfaces, and other miscellaneous optical and electronic devices. During operation, the various devices of a line card may generate significant amounts of heat, which requires the use of cooling equipment and imposes an upper limit on the device-packing density in the line card and/or in the corresponding equipment cabinet or rack.

SUMMARY

Disclosed herein are various embodiments of an optical-power-distribution (OPD) subsystem that provides means for supplying optical local-oscillator signals and optical-carrier signals to various optical line cards, without the need for each optical line card to have a corresponding individual laser source. In one embodiment, a single laser coupled to the OPD subsystem may provide optical local-oscillator signals and/or optical-carrier signals to multiple optical line cards. In another embodiment, multiple lasers coupled to the OPD subsystem may provide multiple optical local-oscillator signals and/or optical-carrier signals to a single line card. Advantageously, the OPD subsystem may provide significant power savings in the operation of the corresponding optical transport system, a reduction in the required equipment-cooling capacity, and/or an increase in the device-packing density within optical line cards and/or inside equipment cabinets that house optical line cards.

According to one embodiment, provided is an optical transport system having a plurality of optical line cards, each having a respective first optical port (e.g., OP) and a respective second optical port (e.g., BD or IN/OUT); a plurality of lasers that are external to the optical line cards; and an OPD subsystem disposed between the plurality of lasers and the plurality of line cards to route optical signals generated by the lasers to the first optical ports of the line cards. Each of the optical line cards is configured to use a respective optical signal applied by the OPD subsystem to the first optical port to provide: an optical-reference signal for coherent detection of a modulated optical signal that the optical line card receives through the second optical port, or an optical-carrier signal that is modulated in the line card to generate a modulated optical signal that the optical line card outputs through the second optical port.

According to another embodiment, provided is an OPD subsystem for an optical transport system, said optical transport system further comprising a plurality of optical line cards and a plurality of lasers. Each optical line card of the plurality of optical line cards has a respective first optical port (e.g., OP) and a respective second optical port (e.g., BD or IN/OUT). The lasers are external to the optical line cards. The OPD subsystem is disposed between the plurality of lasers and the plurality of line cards to route optical signals generated by the lasers to the first optical ports of the line cards. Each of the optical line cards is configured to use a respective optical signal applied by the OPD subsystem to the first optical port to provide: an optical-reference signal for coherent detection of a modulated optical signal that the optical line card receives through the second optical port, or an optical-carrier signal that is modulated in the line card to generate a modulated optical signal that the optical line card outputs through the second optical port.

According to yet another embodiment, provided is an optical line card for an optical transport system, said optical transport system further comprising one or more other optical line cards, a plurality of lasers, and an OPD subsystem. The optical line card has a first optical port (e.g., OP) and a second optical port (e.g., BD or IN/OUT). Each of the one or more other optical line cards has a respective first optical port (e.g., OP) and a respective second optical port (e.g., BD or IN/OUT). The lasers are external to the optical line cards. The OPD subsystem is disposed between the plurality of lasers and the line cards to route optical signals generated by the lasers to the first optical ports of the line cards. Each of the optical line cards is configured to use a respective optical signal applied by the OPD subsystem to the first optical port to provide: an optical-reference signal for coherent detection of a modulated optical signal that the optical line card receives through the second optical port, or an optical-carrier signal that is modulated in the line card to generate a modulated optical signal that the optical line card outputs through the second optical port.

BRIEF DESCRIPTION OF THE DRAWINGS

Other aspects, features, and benefits of various embodiments of the invention will become more fully apparent, by way of example, from the following detailed description and the accompanying drawings, in which.

DETAILED DESCRIPTION

Figure 1:
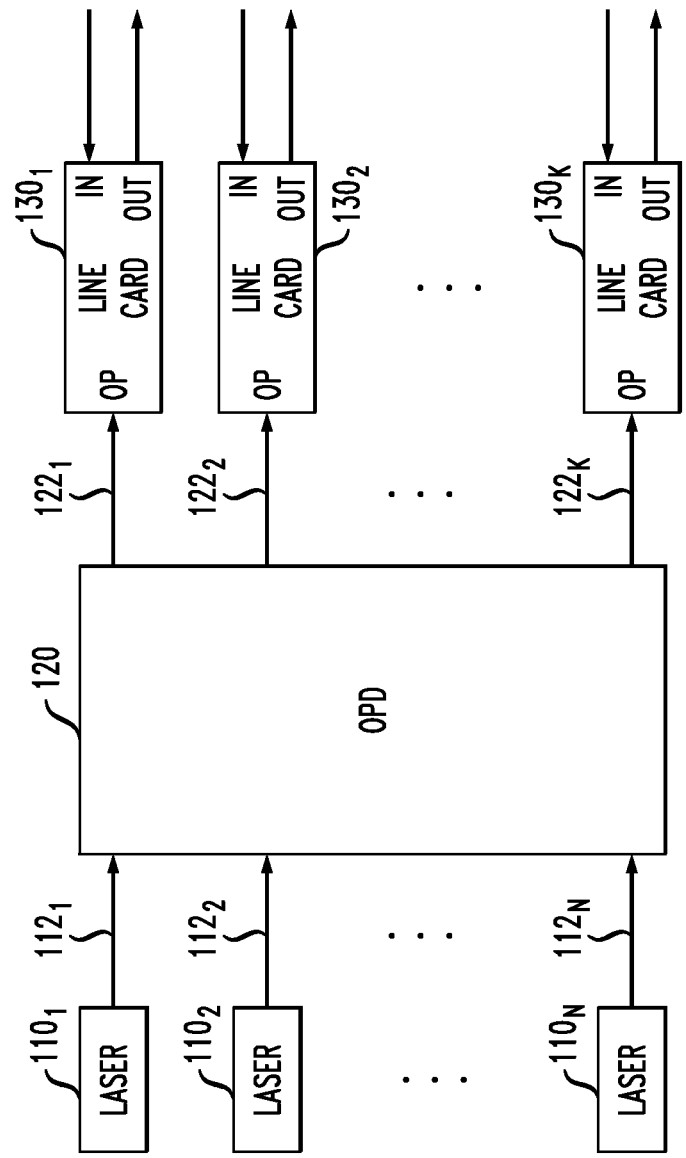
FIG. 1 shows a block diagram of an optical transport system according to one embodiment of the invention.

FIG. 1 shows a block diagram of an optical transport system 100 according to one embodiment of the invention. System 100 has a plurality of optical line cards 130₁-130_K configured to send and/or receive optical communication signals, where K is a positive integer greater than one. In a representative embodiment, an optical line card 130 has three optical ports that are labeled OP, IN, and OUT, respectively, in FIG. 1. Optical port OP serves to receive optical power generated by optical sources, such as lasers 110₁-110_N, that are external to the line card. Optical port IN serves to receive modulated optical signals from a remote transmitter (not explicitly shown in FIG. 1) for demodulation and decoding in line cards 130. Optical port OUT serves to output modulated optical signals produced in line card 130 for transmission to a remote receiver (not explicitly shown in FIG. 1). Although not explicitly shown in FIG. 1, each line card 130 also has one or more electrical ports, e.g., for sending and/or receiving electrical signals corresponding to the incoming and/or outgoing optical signals.

Optical line card 130 differs from a prior-art optical line card, which requires an internal laser source, in that optical line card 130 is designed to use externally generated optical power received through optical port OP for providing (i) one or more optical-reference (e.g., local oscillator) signals to a coherent optical receiver (not explicitly shown in FIG. 1) of the line card and/or (ii) one or more optical-carrier signals to an optical transmitter (not explicitly shown in FIG. 1) of the line card. As such, optical line card 130 does not need and might not have an internal laser source. This characteristic of line card 130 is advantageous in that it enables the use of less-powerful cooling equipment and/or line-card implementations in which the device-packing density is relatively high.

An optical-power distribution (OPD) subsystem 120 of system 100 serves to appropriately route optical signals 112₁-112_N generated by lasers 110₁-110_N, respectively, to optical ports OP of line cards 130₁-130_K. Note that the value of K may be the same as or different from the value of N, and at least some of optical output signals 122₁-122_K produced by OPD subsystem 120 may have contributions from more than one of optical signals 112₁-112_N. Alternatively or in addition, at least one of optical signals 112₁-112_N may contribute to multiple signals among optical signals 122₁-122_K. In one embodiment, K>N≥1. In various embodiments, OPD subsystem 120 may have a physical size that causes the signal-propagation distance between the output port of laser 110 and optical port OP of line card 130 to be in a range between several cm and several km. In certain embodiments, the signal-propagation distance between the output port of laser 110 and optical port OP of line card 130 may even be as large as about 100 km, or larger.

OPD subsystem 120 may be implemented on a single circuit board, on two or more different circuit boards, or as a distributed system that has one or more circuit boards and/or one or more separate/distinct elements or devices. All or part of OPD subsystem 120 may be designed for being placed (i) in the same equipment cabinet or rack as one or more lasers 110 and/or (ii) in the same equipment cabinet or rack as one or more line cards 130, or (iii) in one or more equipment cabinets or racks that do not contain any line cards 130 or lasers 110. In one embodiment, all or part of OPD subsystem 120 and one or more lasers 110 may be placed on the same circuit board.

Each of lasers 110₁-110_N may be a fixed-wavelength laser or a tunable laser. In a representative configuration, different lasers 110 generate different respective wavelengths, e.g., corresponding to carrier wavelengths of a WDM (wavelength-division-multiplexed) signal that is used to transport data to and from system 100. Various configurations of system 100 with an OPD subsystem 120 that can support N lasers 110 are envisioned, in which fewer than N lasers 110 are present in system 100. For example, lasers 110 may be added to or removed from the system when the number of carrier wavelengths in the WDM signal changes.

Figure 2:
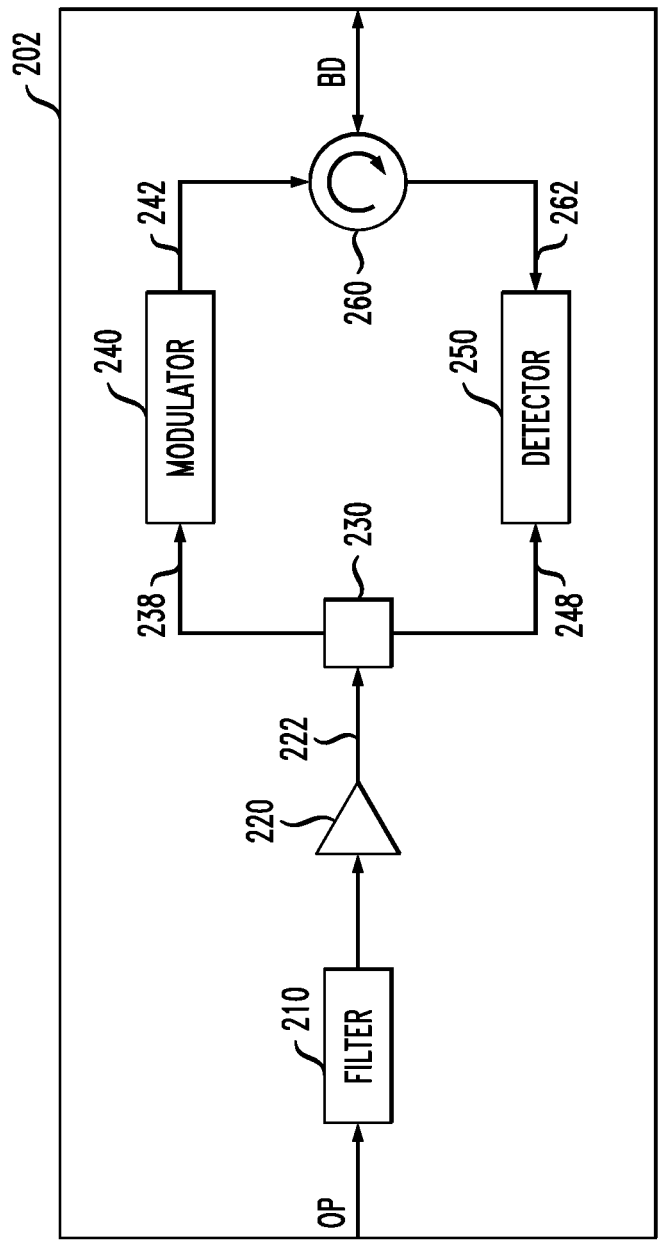
FIG. 2 shows a block diagram of an optical line card that can be used in the optical transport system of FIG. 1 according to one embodiment of the invention.

FIG. 2 shows a block diagram of an optical line card 200 that can be used to implement each optical line card 130 (FIG. 1) according to one embodiment of the invention. Optical line card 200 is implemented on a circuit board 202 and has two optical ports that are labeled OP and BD, respectively, in FIG. 2. Optical port OP in line card 200 is analogous to optical port OP in line card 130 (see FIG. 1) and serves to receive optical power from an external laser source. Optical port BD is a bidirectional port that can function as both an input port that is analogous to optical port IN of line card 130 and an output port that is analogous to optical port OUT of line card 130. The bi-directionality of optical port BD in line card 200 is enabled by an optical circulator 260, which is configured to (i) direct modulated optical signals produced by an optical modulator 240 to optical port BD and (ii) direct external optical signals received at optical port BD to an optical detector 250. In one embodiment, circuit board 202 does not have any lasers mounted thereon. One skilled in the art will appreciate that, in one embodiment, optical circulator 260 may be omitted for optical line card 200 to have two ports (IN and OUT, as shown in FIG. 1) instead of one port BD.

Line card 200 has an optional optical filter 210 and an optional optical amplifier 220. Optical filter 210 may be a fixed or tunable filter whose transmission characteristics enable the filter to select a desired single wavelength or a desired set of wavelengths from the plurality of wavelengths applied to optical port OP of line card 200, e.g., by OPD subsystem 120 (FIG. 1). Optical filter 210 may be omitted, e.g., when optical port OP receives a set of one or more wavelengths that does not contain any undesired wavelengths. Optical amplifier 220 serves to boost the intensity of light applied thereto by filter 210 or optical port OP. Optical amplifier 220 may be omitted, e.g., when the optical power applied to optical port OP is sufficiently high to cause both an optical signal 238 received by optical modulator 240 and an optical signal 248 received by optical detector 250 to have sufficiently high intensities without the presence of optical amplifier 220. The use of a single laser for the generation outgoing modulated signals and coherent detection of incoming modulated signals is disclosed, e.g., in commonly owned U.S. Pat. No. 7,269,356, which is incorporated herein by reference in its entirety.

An optical-power (OP) router 230 receives an optical signal 222 from optical amplifier 220, optical filter 210, or optical port OP and appropriately distributes or routes that optical signal to produce optical signals 238 and 248. In one embodiment, OP router 230 is an optical-power splitter that splits the power of signal 222 in a desired manner (e.g., 50:50 or 80:20) to produce signals 238 and 248. In an alternative embodiment, OP router 230 is a 1×2 optical switch that has two configurations. In the first configuration, substantially all optical power of signal 222 is directed to optical modulator 240 as signal 238. In the second configuration, substantially all optical power of signal 222 is directed to optical detector 250 as signal 248. In yet another alternative embodiment, OP router 230 is an optical de-multiplexer that directs (i) a first set of one or more wavelength components of signal 222 to optical modulator 240 as signal 238 and (ii) a second set of one or more wavelength components of signal 222 to optical detector 240 as signal 248.

Optical modulator 240 uses optical signal 238 as an optical-carrier signal, which it modulates based on a received electrical data signal (not shown in FIG. 2) to produce a modulated optical signal 242. Optical circulator 260 directs modulated optical signal 242 to optical port BD, which outputs the latter as an output signal of line card 200.

In one embodiment, optical detector 250 is a coherent optical detector that uses optical signal 248 as a local-oscillator signal for coherent detection of a modulated optical signal 262 to generate a recovered electrical data signal (not shown in FIG. 2). Signal 262 is produced when optical circulator 260 directs an external optical signal received at optical port BD toward optical detector 250. In a typical mode of operation, optical detector 250 mixes variously phase-shifted copies of optical signal 248 with modulated optical signal 262 to produce mixed optical signals that are indicative of the in-phase (I) and quadrature-phase (Q) components of various symbols encoded onto signal 262 by a remote transmitter.

In an alternative embodiment, optical detector 250 may be a direct-detection receiver that does not need signal 248 for demodulating and decoding signal 262. In this particular embodiment, OP router 230 may be omitted, and the output of optical amplifier 220 may be connected directly to optical modulator 240.

In one possible embodiment, modulator 240 may be omitted from optical line card 200. As a result, such an optical line card is able to function as a receiver only, rather than as a transceiver. In another possible embodiment, detector 250 may be omitted from optical line card 200. As a result, such an optical line card is able to function as a transmitter only, rather than as a transceiver.

Figure 3:
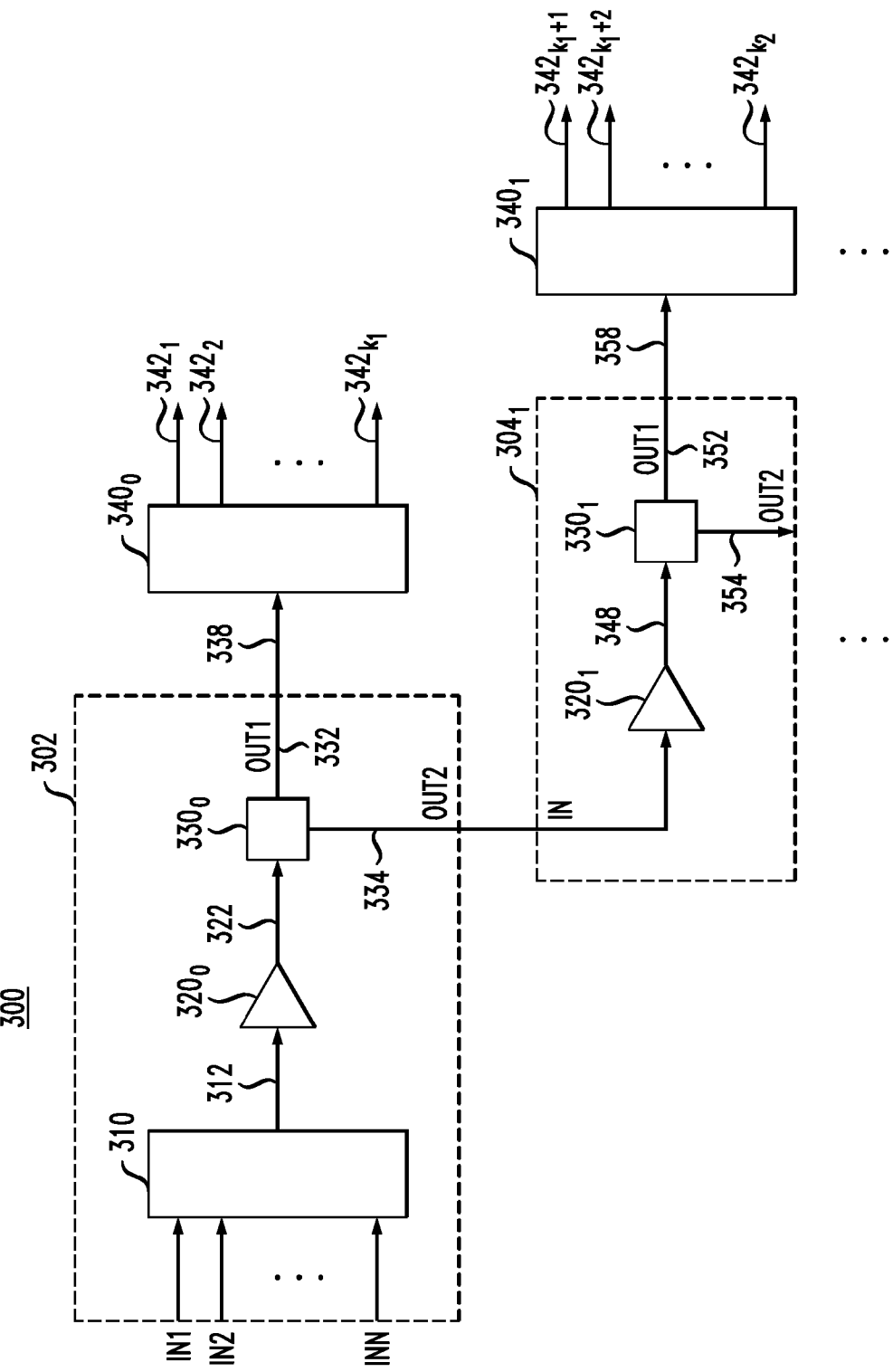
FIG. 3 shows a block diagram of an optical-power distribution (OPD) subsystem that can be used in the optical transport system of FIG. 1 according to one embodiment of the invention.

FIG. 3 shows a block diagram of an OPD subsystem 300 that can be used as OPD subsystem 120 (FIG. 1) according to one embodiment of the invention. OPD subsystem 300 is illustratively shown as having two circuit boards 302 and $304_1$ and two OP routers $340_0$ and $340_1$, each of which is implemented as a separate optical device. In alternative embodiments, the structure of OPD device 300 may be expanded as indicated by the ellipses in FIG. 3 by adding one or more additional circuit boards 304 each followed by a corresponding additional PO router 340. For example, to add a circuit board $304_2$ to the subsystem shown in FIG. 3, optical port IN of circuit board $304_2$ (not explicitly shown in FIG. 3) is connected to optical port OUT2 of circuit board $304_1$. An OP router $340_2$ (not explicitly shown in FIG. 3) is then connected to optical port OUT1 of circuit board $304_2$. To further add a circuit board $304_3$ to the resulting subsystem, optical port IN of circuit board $304_3$ (not explicitly shown in FIG. 3) is connected to optical port OUT2 of circuit board $304_2$, and then an OP router $340_3$ (not explicitly shown in FIG. 3) is connected to optical port OUT1 of circuit board $304_3$, and so on.

System upgrades may be performed in OPD subsystem 300 as appropriate or necessary, e.g., to increase the number of line cards, such as line cards 130 (FIG. 1) or 200 (FIG. 2), to which the OPD subsystem supplies optical power. At its initial deployment, OPD subsystem 300 may only have circuit board 302 and OP router $340_0$. At the time of the first system upgrade, circuit board $304_1$ and OP router $340_1$ may be added and connected to circuit board 302 as indicated in FIG. 3. In various embodiments, circuit board $304_1$ may be placed in the same equipment cabinet or rack as circuit board 302 or in a different equipment cabinet or rack. At the time of a second system upgrade, circuit board $304_2$ and OP router $340_2$ may be added and connected to circuit board $304_1$ as explained above. In various embodiments, circuit board $304_2$ may be placed in the same equipment cabinet or rack as that of circuit board 302 and/or circuit board $304_1$ or in a different equipment cabinet or rack.

Circuit board 302 has N optical input ports labeled IN1−÷INN and two optical output ports labeled OUT1 and OUT 2. Optical input port INi may be connected to a laser, such as laser $110_i$ (see FIG. 1), where i∈[1,N]. As already indicated above in the description of FIG. 1, some of optical input ports IN1−÷INN may remain idle, e.g., unconnected to lasers 110. Optical output port OUT1 is connected to OP router $340_0$ as indicated in FIG. 3. Optical output port OUT2 may remain idle or be connected to circuit board $304_1$ as indicated in FIG. 3.

An OP combiner 310 of circuit board 302 combines the optical signals applied to optical input ports IN1−÷INN, e.g., by one or more lasers 110, to produce a combined optical signal 312. Combined optical signal 312 may be amplified in an optical amplifier $320_0$ to produce a corresponding amplified optical signal 322. Optical amplifier $320_0$ may be omitted or set to a 0-dB gain when signal 312 has sufficiently high intensity.

An OP splitter $330_0$ splits the power signal 322 in a desired manner (e.g., 50:50 or 90:10) to produce signals 332 and 334. Signal 332 is directed to output port OUT1 of circuit board 302 and further directed, via an optical fiber 338, to OP router $340_0$ as indicated in FIG. 3. Signal 334 is directed to optical output port OUT2 of circuit board 302 and may be further directed, via an optical fiber 336, to optical input port IN of circuit board $304_1$ as further indicated in FIG. 3. In various embodiments, each of optical fibers 336 and 338 may have a length between several cm and several hundred km, and may include one or more optical amplifiers along its length.

An optical amplifier $320_1$ of circuit board $304_1$ amplifies optical signal 334 to produce an amplified optical signal 348. An optical-power splitter $330_1$ splits the power of signal 348 in a desired manner to produce optical signals 352 and 354. Signal 352 is directed to output port OUT1 of circuit board $304_1$ and further directed, via an optical fiber 358, to OP router $340_1$. Signal 354 is directed to optical output port OUT2 of circuit board $304_1$. In various embodiments, optical fiber 358 may have a length between several cm and hundred several km, and may include one or more optical amplifiers along its length.

OP router $340_0$ receives optical signal 332 via optical fiber 338 and splits the received signal in a desired manner to produce optical signals $342_1$-$342_{k1}$. OP router $340_1$ receives optical signal 352 via optical fiber 358 and splits the received signal in a (possibly different) desired manner to produce optical signals $342_{k1+1}$-$342_{k2}$. Note that an optical signal $342_i$ (FIG. 3) corresponds to optical signal $122_i$ (FIG. 1).

In one embodiment, relatively large distances separate certain components of OPD subsystem 300 from each other. For example, a distance that is greater than about 1 m, 100 m, 1 km, or 100 km may separate OP combiner 310 and OP router $340_0$ from one another. Alternatively or in addition, a distance that is greater than about 1 m, 100 m, 1 km, or 100 km may separate circuit boards 302 and $304_1$ from one another. Furthermore, a distance that is greater than about 1 m, 100 m, 1 km, or 100 km may separate circuit board $304_1$ and OP router $340_1$ from one another.

Figure 4:
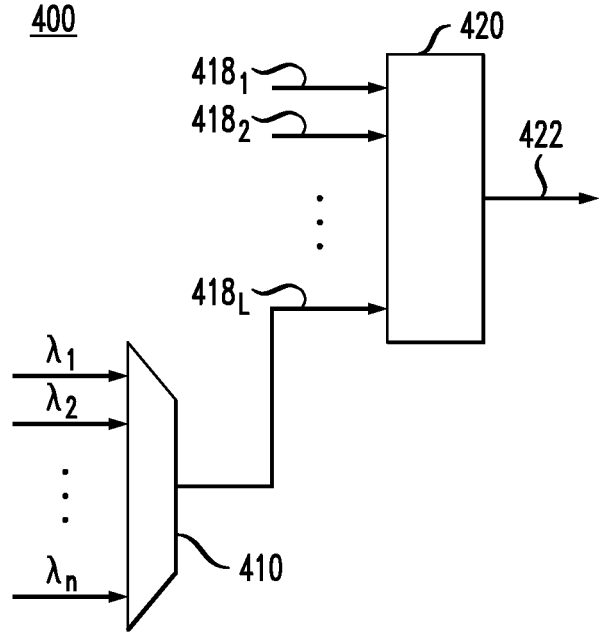
FIG. 4 shows a block diagram of an optical-power (OP) combiner that can be used in the OPD subsystem of FIG. 3 according to one embodiment of the invention.

FIG. 4 shows a block diagram of an OP combiner 400 that can be used as OP combiner 310 (FIG. 3) according to one embodiment of the invention. OP combiner 400 has a power combiner 420 that combines the power of optical signals $418_1$-$418_L$ applied to its input ports regardless of the spectral composition of those signals, where L is an integer greater than one. In other words, an optical output signal 422 produced by power combiner 420 has a spectrum that substantially is a sum of the spectra of optical signals $418_1$-$418_L$.

One or more of optical signals $418_1$-$418_{L-1}$ may be produced using the corresponding one or more optical-signal multiplexers (MUXs), each of which can be similar to MUX 410. More specifically, MUX 410 produces optical signal $418_L$ by multiplexing wavelength components $\lambda_1$ through $\lambda_n$. One skilled in the art will appreciate that one difference between a MUX, such as MUX 410, and a power combiner, such as power combiner 420, is that, in addition to combining its input signals, a MUX acts as a comb filter. For example, MUX 410 acts as a band-pass filter that transmits a relatively narrow spectral band centered around wavelength $\lambda_1$ for signals applied to the first input port. MUX 410 also acts as a band-pass filter that transmits a relatively narrow spectral band centered around wavelength $\lambda_2$ for signals applied to the second input port, etc. As a result, the spectrum of optical signal $418_L$ may differ from the spectral sum of the input signals applied to MUX 410. These spectral characteristics of MUX 410 may be advantageous when OP combiner 400 is used to transport carrier wavelengths and/or reference signals corresponding to a WDM signal.

Various alternative embodiments are envisioned in which OP combiner 400 could be or could include one or more of a static MUX, a dynamically reconfigurable MUX, a "colorless" power combiner, a band combiner or multiplexer, etc. In general, alternative embodiments of OP combiner 400 may employ any number of elements/devices that are designed to combine: (i) monochromatic light of two or more different wavelengths; (ii) light of one spectral band with light of another spectral band; and (iii) monochromatic light with light of a spectral band. OP combiner 400 may further include one or more wavelength-selective and/or "colorless" switches and routers. Different light-combining/routing elements may be interconnected in any desired manner that enables light collection, transport, and delivery from the deployed light sources (such as lasers 110, FIG. 1) to the deployed optical line cards (such as line cards 130, FIG. 1).

Figure 5:
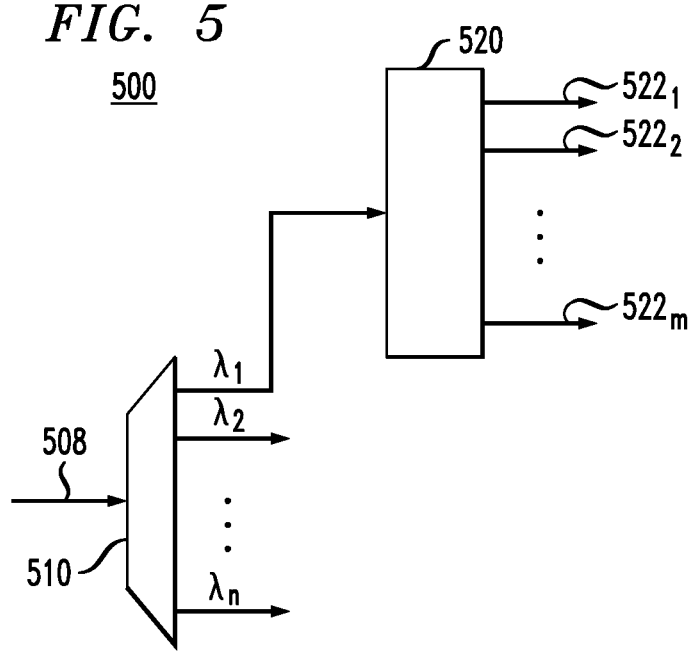
FIG. 5 shows a block diagram of an OP router that can be used in the OPD subsystem of FIG. 3 according to one embodiment of the invention.

FIG. 5 shows a block diagram of an OP router 500 that can be used to implement each OP router 340 (FIG. 3) according to one embodiment of the invention. OP router 500 has an optical-signal de-multiplexer (DMUX) 510. DMUX 510 may be implemented, e.g., using MUX 410 (FIG. 4) configured to operate in reverse. As such, DMUX 510 acts as a comb filter that decomposes an optical input signal 508 into spectral components $\lambda_1$ through $\lambda_n$. These spectral characteristics of DMUX 510 may be advantageous when OP router 500 is used to transport carrier wavelengths and/or reference signals corresponding to a WDM signal.

One or more of spectral components $\lambda_2$-$\lambda_n$ produced by DMUX 510 may be applied to one or more additional respective power splitters, each of which can be similar to power splitter 520 that is configured to receive spectral component $\lambda_1$. A power splitter is an optical device that splits the optical power of an input signal without changing the signal's spectrum, thereby producing multiple attenuated copies of that signal at the output ports of the device. For example, power splitter 520 produces output signals $522_1$-$522_m$, each of which is an attenuated copy of spectral component $\lambda_1$, where m is an integer greater than one. Signals $522_1$-$522_m$ can be used, e.g., to supply the same carrier wavelength and/or reference signal to m different line cards 130 or 200. One or more additional instances of power splitter 520 may be used to similarly produce attenuated copies of any of spectral components $\lambda_2$-$\lambda_n$.

In an alternative embodiment, DMUX 510 may be removed from OP router 500. This particular embodiment may be useful, e.g., for feeding optical power to line cards 210 having tunable filter 210 (FIG. 2). By tuning filter 210 so that it selects and transmits only one desired WDM wavelength, the comb-filter functionality of DMUX 510 is delegated to the line cards, which enables the removal of the DMUX from OP router 500. When DMUX 510 is removed, signal 522 may contain a plurality of wavelengths generated by a corresponding subset of lasers $110_1$-$110_N$.

Various alternative embodiments are envisioned in which OP router 500 could be or could include one or more of a static DMUX, a dynamically reconfigurable DMUX, a "colorless" power splitter, a band splitter or multiplexer, etc. In general, alternative embodiments of OP router 500 may employ any number of elements/devices that are designed to separate: (i) monochromatic light from non-monochromatic light and (ii) light of one spectral band from light of a broader spectral band or combination of bands. OP router 500 may further include one or more wavelength-selective and/or "colorless" switches and routers. Different light-splitting/routing elements may be interconnected in any desired manner that enables optical-power delivery and distribution to the deployed optical line cards (such as line cards 130, FIG. 1).

Various embodiments of optical transport system 100 may offer one or more of the following benefits/advantages:

(1) Optical-power generation can be removed from line cards, centralized, and shared across multiple subsystems for convenient maintenance, repair, and upgrade of the corresponding light sources;
(2) A several-fold reduction, per line card, in the consumption of electrical power used for the generation of optical-carrier and optical local-oscillator signals;
(3) A significant reduction in the required cooling capacity per line card;
(4) The system is amenable to relatively straightforward upgrades to accommodate changes in the spectral content of transported WDM signals and/or in the number of line cards that are being supplied with optical power; and
(5) The system is amenable to relatively straightforward standardization for making it compatible with equipment offered by different line-card and equipment vendors.

While this invention has been described with reference to illustrative embodiments, this description is not intended to be construed in a limiting sense.

As used herein, the phrase "external to a line card" should be interpreted as meaning (i) being mounted on a circuit board that is not part of the line card in question, (ii) being located in a different equipment cabinet or rack than the line card in question, and/or (iii) being connected to the line card in question by the length of optical fiber that is longer than about 1 m.

As used herein, the phrase "internal to a line card" should be interpreted as meaning (i) being mounted on a circuit board that is part of the line card in question and/or (ii) being part of an optical device that is part of the line card in question.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Various modifications of the described embodiments, as well as other embodiments of the invention, which are apparent to persons skilled in the art to which the invention pertains are deemed to lie within the principle and scope of the invention as expressed in the following claims.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The description and drawings merely illustrate the principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

What is claimed is:

1. A system, comprising:
   a plurality of optical line cards;
   a plurality of lasers that are external to the optical line cards; and
   an optical-power-distribution (OPD) subsystem disposed between the plurality of lasers and the plurality of line cards to route optical signals generated by the lasers to the line cards, wherein each of the optical line cards is configured to use a respective optical signal received from the OPD subsystem to provide an optical-reference signal for coherent detection of a modulated optical signal received by the optical line card; and
   wherein the OPD subsystem comprises:
      an optical-power combiner having a plurality of input ports and an output port; and
      a first optical-power router having an input port and a plurality of output ports, wherein:
         the plurality of input ports of the optical-power combiner are coupled to the plurality of lasers so that each input port is either idle or configured to receive an optical signal generated by one of the lasers;
         the optical-power combiner is configured to combine the optical signals applied to the input ports thereof to produce a combined optical signal at the output port thereof;
         the input port of the first optical-power router is coupled to the output port of the optical-power combiner to receive an optical signal corresponding to the combined optical signal; and
         the first optical-power router is configured to split the received optical signal to produce a plurality of optical output signals at the output ports thereof and apply said optical output signals to a corresponding subset of the optical line cards.

2. The system of claim 1, wherein at least one optical line card of the plurality of optical line cards does not have an internal laser.

3. The system of claim 1, wherein:
   at least one optical line card of the plurality of optical line cards is housed in a first equipment cabinet or rack;
   at least one laser of the plurality of lasers is housed in a second equipment cabinet or rack; and
   the OPD subsystem is configured to route an optical signal generated by said at least one laser to said at least one optical line card.

4. The system of claim 3, wherein a distance between the at least one optical line card and the at least one laser is greater than about one meter.

5. The system of claim 1, wherein the OPD subsystem further comprises:
   a first optical-signal splitter having an input port and first and second output ports; and
   a second optical-power router, wherein:
      the input port of the first optical-signal splitter is coupled to the output port of the optical-power combiner;
      the first output port of the first optical-signal splitter is coupled to the input port of the first optical-power router;
      the second output port of the first optical-signal splitter is coupled to an input port of the second optical-power router; and
      the second optical-power router is configured to split the received optical signal to produce a plurality of optical output signals at output ports thereof and apply said optical output signals to a second subset of the optical line cards.

6. The system of claim 5, wherein the OPD subsystem further comprises:
   a first optical amplifier disposed between the output port of the optical-power combiner and the input port of the first optical-signal splitter; and
   a second optical amplifier disposed between the second output port of the first optical-signal splitter and the input port of the second optical-power router.

7. The system of claim 6, wherein:
   the first optical amplifier is located on a first circuit board; and
   the second optical amplifier is located on a different, second circuit board.

8. The system of claim 5, wherein the OPD subsystem further comprises a second optical-signal splitter having an input port and first and second output ports, wherein:

the input port of the second optical-signal splitter is coupled to the second output port of the first optical-signal splitter; and the first output port of the second optical-signal splitter is coupled to the input port of the second optical-power router.

9. The system of claim 1, wherein:

the optical-power combiner comprises at least one of an optical multiplexer and a power combiner; and the first optical-power router comprises at least one of an optical de-multiplexer and a power splitter.

10. The system of claim 1, wherein the optical-power combiner and the first optical-power router are separated from one another by more than one meter.

11. The system of claim 1, wherein:

different lasers of the plurality of lasers are configured to generate different respective wavelengths; and the OPD subsystem is configured to route the optical signals generated by the lasers so that at least two different optical line cards receive a wavelength generated by the corresponding one laser.

12. The system of claim 1, wherein:

different lasers of the plurality of lasers are configured to generate different respective wavelengths; and the OPD subsystem is configured to route the optical signals generated by the lasers so that at least one optical line card receives a plurality of wavelengths generated by a corresponding subset of the lasers.

13. The system of claim 12, wherein the at least one optical line card comprises a tunable filter that enables said line card to select any one of the received wavelengths to provide said optical-reference signal or said optical-carrier signal.

14. The system of claim 1, wherein the OPD subsystem comprises at least two circuit boards that are separated from one another by more than one meter.

15. An optical-power-distribution (OPD) subsystem for an optical transport system, said OPD subsystem comprising:

an optical-power combiner having a plurality of input ports and an output port; and a first optical-power router having an input port and a plurality of output ports, wherein:

the OPD subsystem is configured to be disposed between a plurality of lasers of the optical transport system and a plurality of line cards of the optical transport system to route optical signals generated by the lasers to the line cards to provide to each of the line cards of the plurality of line cards an optical-reference signal for coherent detection of a modulated optical input signal received by the optical line card; and the plurality of input ports of the optical-power combiner are configured to be coupled to the plurality of lasers so that each input port is either idle or configured to receive an optical signal generated by one of the lasers;

the optical-power combiner is configured to combine the optical signals applied to the input ports thereof to produce a combined optical signal at the output port thereof;

the input port of the first optical-power router is coupled to the output port of the optical-power combiner to receive an optical signal corresponding to the combined optical signal; and the first optical-power router is configured to split the received optical signal to produce a plurality of optical output signals at the output ports thereof and apply said optical output signals to a corresponding subset of the line cards.

16. A system, comprising:

a plurality of optical line cards;

a plurality of lasers that are external to the optical line cards; and an optical-power-distribution (OPD) subsystem disposed between the plurality of lasers and the plurality of line cards to route optical signals generated by the lasers to the line cards, wherein each of the optical line cards is configured to use a respective optical signal received from the OPD subsystem to provide one or both of:

an optical-reference signal for coherent detection of a modulated optical signal received by the optical line card; and an optical-carrier signal to be modulated in the line card to generate a modulated optical output signal; and wherein the OPD subsystem comprises:

an optical-power combiner having a plurality of input ports and an output port; and a first optical-power router having an input port and a plurality of output ports, wherein:

the plurality of input ports of the optical-power combiner are coupled to the plurality of lasers so that each input port is either idle or configured to receive an optical signal generated by one of the lasers;

the optical-power combiner is configured to combine the optical signals applied to the input ports thereof to produce a combined optical signal at the output port thereof;

the input port of the first optical-power router is coupled to the output port of the optical-power combiner to receive an optical signal corresponding to the combined optical signal; and the first optical-power router is configured to split the received optical signal to produce a plurality of optical output signals at the output ports thereof and apply said optical output signals to a corresponding subset of the optical line cards; and wherein the OPD subsystem further comprises:

a first optical-signal splitter having an input port and first and second output ports; and a second optical-power router, wherein:

the input port of the first optical-signal splitter is coupled to the output port of the optical-power combiner;

the first output port of the first optical-signal splitter is coupled to the input port of the first optical-power router;

the second output port of the first optical-signal splitter is coupled to an input port of the second optical-power router; and the second optical-power router is configured to split the received optical signal to produce a plurality of optical output signals at output ports thereof and apply said optical output signals to a second subset of the optical line cards.

17. The system of claim 16, wherein the OPD subsystem further comprises:

a first optical amplifier disposed between the output port of the optical-power combiner and the input port of the first optical-signal splitter; and a second optical amplifier disposed between the second output port of the first optical-signal splitter and the input port of the second optical-power router.

18. The system of claim 17, wherein:

the first optical amplifier is located on a first circuit board; and the second optical amplifier is located on a different, second circuit board.

19. The system of claim 16, wherein the OPD subsystem further comprises a second optical-signal splitter having an input port and first and second output ports, wherein:
- the input port of the second optical-signal splitter is coupled to the second output port of the first optical-signal splitter; and
- the first output port of the second optical-signal splitter is coupled to the input port of the second optical-power router.

* * * * *